United States Patent [19]
Malinich

[11] 3,974,363
[45] Aug. 10, 1976

[54] PROGRAMMABLE BILLING SYSTEM

[75] Inventor: Richard M. Malinich, Rochester, N.Y.

[73] Assignee: Xerox Corporation, Stamford, Conn.

[22] Filed: Jan. 27, 1975

[21] Appl. No.: 544,098

Related U.S. Application Data

[63] Continuation of Ser. No. 348,827, April 6, 1973, abandoned.

[52] U.S. Cl. .................. 235/925 B; 235/92 DM; 235/92 CC; 235/92 R; 355/14
[51] Int. Cl.² .................................... G06B 27/06
[58] Field of Search ...... 235/92 SB, 92 DM, 92 CC; 355/14

[56] References Cited
UNITED STATES PATENTS

| | | | |
|---|---|---|---|
| 3,358,570 | 12/1967 | Morrill et al. | 235/92 SB |
| 3,682,544 | 8/1972 | Glaser | 355/14 |

*Primary Examiner*—Joseph M. Thesz

[57] ABSTRACT

A programmable billing system for use in an automatic copying machine having wide flexibility in the automatic calculation of total bills using a single meter readout to count pulse trains weighted in proportion to the mode of operation of the machine and the billing rate per copy during operation in the selected mode. The system includes a copy counter for generating a unique binary code for each copy made from the same original. The output of the copy counter addresses a semiconductor memory device which is programmed to generate a set of unique binary billing rate signals for each different input or group of inputs from the copy counter during operation in a particular machine mode. The binary billing rate signals are programmed to be representative of the billing rate for the copy then being processed by the machine and are fed to a count down counter which generates a single pulse or a plurality of pulses or each copy, each pulse being representative of a single billing unit or rate. The total number of output pulses from the count down counter for a given copy is therefore a weighted output proportional to the relative cost of the given copy. An output pulse counter receives and counts the total number of output pulses generated by the count down counter and operates a billing meter. The total bill for operation of the copy machine may be calculated subsequently by simply multiplying the output meter reading by the known billing unit charge.

16 Claims, 1 Drawing Figure

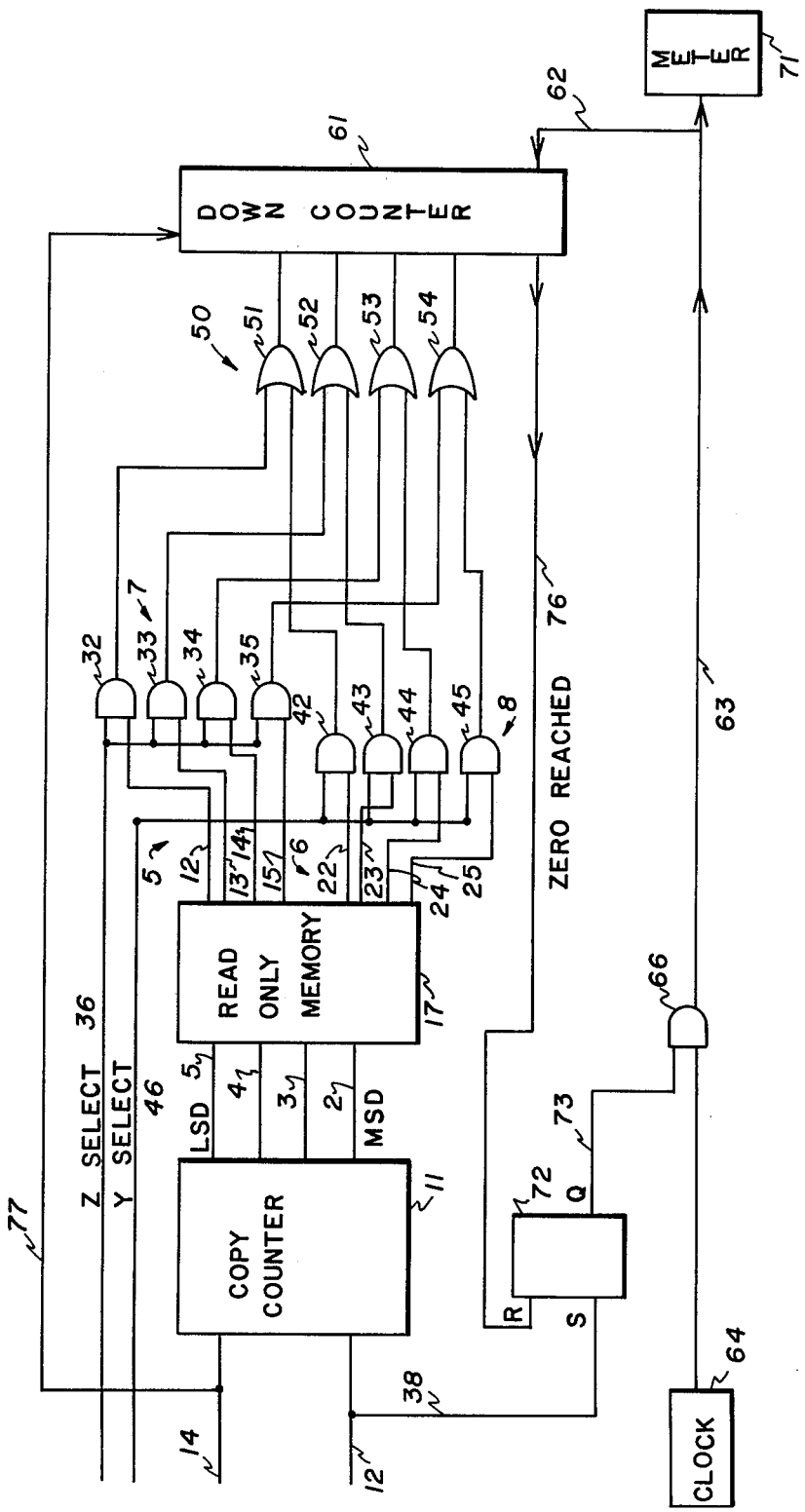

PROGRAMMABLE BILLING SYSTEM

This is a continuation of application Ser. No. 348,827, filed Apr. 6, 1973, now abandoned.

BACKGROUND OF THE INVENTION

This invention relates to a programmable billing system suitable for use in an automatic reproducing machine. In its broadest aspects the system provides a means for counting reoccurring events and generating a weighted output signal proportional to the billing value of the events.

In automatic copying machines, billing information is generally obtained by sensing some machine occurrence, such as support material feeding or the like, and sending this information directly to a billing meter system via a hard wired electrical network. In such arrangments, the billing system merely counts the total number of copies, which number is later employed to arrive at a final bill. An example of such a hard wired prior art billing system can be found in U.S. Pat. No. 3,358,570.

In leased copying machines which operate in a single mode, it is common practice to bill customers at a set rate for each copy made. It is also common practice to lease such machines at a set charge for a minumum predetermined number of copies and, then, on a somewhat reduced rate for all copies in excess of the predetermined number made during any given billing period. Under this arrangement, assuming the same total number of copies made during a given period, the rate charged per copy does not vary according to the length of the runs made from any one original at one time. Inasmuch as the use of the machine for short copy runs results in increased wear of the machine over medium and long copy runs, it is desirable to adjust the billing rate for copies on a basis proportionate to the actual wear or usage imposed upon the machine. This required a more sophisticated billing system to monitor the billing charges for each machine.

In addition, current copy machines are capable of operation in a variety of different operating modes. For example, copy machines, in addition to the capability of generating standard size reproductions of black on white material, are now capable also of producing reduced copies, enlarged copies, single color and multicolor copies, to mention but a few.

Inasmuch as each operating mode may have a different billing rate per copy produced, the complexity of calculating the monthly lease fee is again greatly increased. Since, as mentioned above, the rates within each mode are also to be varied based on actual wear of the machine the problem of automatically calculating the total bill becomes even more complex. It is easily seen that there is an unacceptably large probability of error in manually arriving at a total fee based on different rates for each of several different operating modes and different rates within each mode depending on the length of each run.

In addition to the above-noted complexities, a change in the rates for each mode and copy run length became a technically difficult duty to be accomplished and verified in the field.

OBJECTS & SUMMARY OF THE INVENTION

It is therefore an object of the present invention to provide an improved billing system for use in copying machines or the like.

A further object of the present invention is to provide a billing meter system which can be rapidly and conveniently programmed to account for changes in billing rates.

Yet another object of the present invention is to reduce the amount of time required to change the billing scheme in an automatic machines.

Still another object of the present invention is to provide a programmable logic system for recording various events carried out by an automatic copying device.

A still further object is the provision of a billing system capable of counting the number of copies in each copy run and applying a weighting factor to each copy according to the mode of operation of the machine and the numbered location or place of the particular copy in the copy run.

A still further object of the present invention is the provision of a programmable billing system providing for a wide flexibility in programming billing rate "break points" into a billing meter system, wherein the term "break point" is used to signify the point of transition in a set of copies at which the billing rate changes.

These and further objects are attained by the preferred embodiment of the invention wherein a pulse train indicative of the number of copies from the same original is fed into a binary counter, the output of which is coupled to a semiconductor read-only memory which generates a unique binary billing rate code for each different input or groups of inputs. The billing rate code is loaded into a second counter which generates a single pulse or a plurality of pulses which operate as a weighting factor for computing the final bill. The semiconductor memory may be programmed to provide a plurality of different sets of billing rate codes depending upon the mode of operation of the copy machine, and the copy run length.

BRIEF DESCRIPTION OF THE DRAWINGS

For a better understanding of the invention as well as other objects and further features thereof, reference may be had to the following detailed description of the invention to be read in connection with the accompanying drawing comprising an electrical block diagram of the preferred embodiment of the billing system.

DESCRIPTION OF THE PREFERRED EMBODIMENT

Although the billing system of the present invention is not necessarily so limited in its usage, it will be herein explained in conjunction with an automatic copying machine employing a reusable xerographic process. As it is widely known and used in the art, the reusable xerographic process involves recording a light image of an original to be reproduced upon the surface of a moving photosensitive plate in the form of a latent electrostatic image; developing the latent image, preferably by means of a dry toner material; and then transferring and fusing the developed image onto a sheet of final support material such as paper or the like. A detailed description of the construction of the particular copy machine is not deemed necessary to an understanding of the invention, but aspects thereof will be alluded to briefly hereinafter where considered necessary.

Referring to the drawing, the invention comprises a binary counter 11 which counts the number of copies made during each copy run, i.e., the number of copies made from the same original. In conventional fashion, the output lines 2–5 of the counter 11 transmit electrical signals indicative of binary digits, 1's and 0's, line 5 being designated as the least significant digit (LSD) and line 2 being designated the most significant digit (MSD). The binary counter 11 is illustrated as having 4 output terminals or digit positions signifying a counter having a 15 count capacity. It should be understood that the capacity of the binary counter 11 may be varied depending upon the capacity of the particular copying machine and that the binary counter 11 shown is merely illustrative.

The input to the counter 11 is in the form of a pulse train received along line 12. One pulse appears on line 12 for each copy made in a single run, a run being designated as a series of copies made consecutively from the same original. These input pulses on line 12 may be generated by the internal mechanism of the copy machine in various ways. For example, a microswitch may be closed momentarily upon the passage of each copy to a collecting tray, or alternatively a microswitch may be operated by a cam upon full or partial rotation of a xerographic drum. In either event, each pulse received on line 12 represents a single copy in a given copy run. The output of the counter 11 is, therefore, a binary signal representative of the number of copies made from each original being copied. For example, an output signal represented by 0100 would appear on lines 2–5 in response to the making of the 4th copy of the same original, assuming the counter 11 was in a reset condition at the beginning of the copy run.

The counter 11 continues counting until receipt of a reset pulse on line 14. The reset pulse may also be generated internally of the copy machine in a variety of different ways. For example, in copy machines having a platen cover which is moved to insert each new document into the copy position, a microswitch may be located to be responsive to the movement of the platen cover to indicate the end of each copy run, at which time counter 11 is cleared.

The binary output signal from the copy counter 11 is coupled to a read-only memory unit (ROM) 17. Read-only memory units of various capacities are commercially available and, as is well known, may be programmed to provide a unique output code for each distinct input or group of inputs. For example, when the output of the copy counter 11 is a binary 1 (0001), the ROM output may be programmed to be a binary 10 (1010), or when the copy count is 2 (0010) the ROM output may be 8 (1000). It is also possible to program the ROM to generate a single binary output in response to a group of input counts. For example, counts 4–10 from the copy counter 11 may be programmed to generate the same ROM output, such as binary 4 (0100). It can be seen that the ROM 17 provides a means of wide flexibility whereby different binary inputs may generate unique output codes.

the key to utilizing the ROM 17 in the billing arrangement of the invention is to select the output of the ROM to operate as a weighting factor representative of the billing rate for the particular copy counted. Thus, referring back to the hypothetical arrangement noted in the previous paragraph, a binary 1 from the copy counter 11 may generate an ROM output of binary 10, which would represent 10 billing units of charge to be assigned to that particular copy, while binary copy counts 4–10 would result in a binary output from the ROM of 4, which would represent 4 billing units to be assigned to each copy of that group.

It is thus seen that for each binary copy count output of the copy counter 11, (or groups thereof), a unique ROM output is generated and this ROM output is selected to be representative of the billing rate or number of billing units to be assigned to that particular copy.

As alluded to above, it is also desirable to generate different sets of ROM outputs depending on the mode of operation of the copy machine. Thus, when the copy machine is operated in mode Z, which may be a color copy mode, a first billing rate table is employed, but when the machine is operated in mode Y, which may be the ordinary black on white copy mode, a second billing rate table is employed. This is accomplished in the present embodiment by using a ROM unit 17 which provides two sets of outputs 5 and 6 for each input and selecting the proper set by means of the output gating circuits 7 and 8. ROM output code set 5 appears on lines 12–15 and is gated through the AND gates 32–35, respectively, by means of a Z table select signal appearing on line 36. ROM output code set 6 appears on lines 22–25 and is gated through AND gates 42–45 by means of a Y table select signal on line 46. The table select signals on lines 36 and 46 may be generated in various conventional ways by the internal mechanism of the copy machine. For example, when the operator of the machine depresses a selection button to chose operation in mode Y, which may be a multicolor mode, for example, a microswitch may be located to respond thereto to generate select Y signal on line 46. Likewise, a similar select Z signal on line 36 may be generated in response to selection by the operation of an alternative mode of operation, for example, the size reduction copy mode.

When Z table select is present the set 5 output codes of the ROM 17 are gated through AND gates 32–35 to OR gates 51–54. Likewise, when Y table select signal is present, the ROM output codes of set 6 are gated through AND gates 42–45 to the OR gates 51–54. Thus, selective enabling of the AND gate circuits 7 or 8 results in passage of one set of billing rate codes (sets 5 or 6) to the OR gate circuits 50.

The selected set of binary output codes from AND gates 7 to 8 is coupled via an output gating circuit 50 comprising OR gates 51–54 to a down counter 61 which is preset to the value of the received billing rate code and stepped or operated at a rate determined by clock pulses received via lines 62 and 63 from the clock pulse generator 64. The clock pulse generator 64 may comprise conventional free running oscillator which operates at a frequency very much greater than the time required by the copy machine to make a single copy. A pulse counting device or meter 71 is also coupled to line 63 to count the total number of clock pulses gated onto line 63 and to the down counter 61.

Clock pulses from generator 64 are selectively gated onto line 63 through AND gate 66 which is controlled by signals generated by a control flip-flop 72. Flip-flop 72 operates to generate two signals which are applied to the AND gate 66 via line 73 to either open or close the AND gate 66. The first or enabling signal which closes generated in gate 66 to permit passage of clock pulses is generated in response to each copy count pulse on line 12 applied to the flip-flop 72 via line 38. As noted above, a pulse is received on line 12 from the copy machine each time a copy is made. Upon application of the copy pulse via line 38, the flip-flop 72 switches output states and this change in output is coupled to the AND gate 66 via line 73 to enable it to pass clock pulses onto line 63. Once switched, flip-flop 72 remains in this condition until a second or reset signal is received from the down counter 61 on line 76 indicating that the zero count has been reached. This zero-reached pulse on line 76 operates to reset or change the state of the flip-flop 72 back to its original condition, which change in output is transmitted to the AND gate 66 via line 73 to again open it and prevent the passage of clock pulses.

Thus, the down counter 61 is preset to a new value after the occurrence of each copy pulse on line 12. The value to which it is preset is determined by the ROM 17 output which provides a starting point from which the counter 61 begins to operate or "count down". As the counter 61 is pulsed by the clock signal on line 63, it counts down to zero at which time the zero-reached pulse is generated on line 76.

Also connected to line 63 is a meter 71 for counting the total number of pulses received on line 63 and passed to the counter 61. The total number is equal to the total number of counts the counter 61 has been stepped for each of the copies processed by the machine. It also represents, in accordance with our selection scheme, the total number of billing units to be charged to the machine, each billing unit having a common known charge value. The number of pulses reaching the billing meter 71 per copy varies in accordance with the value of the binary number (billing rate code) loaded by the ROM 17 into the down counter 61, which number comprises a weighting factor representative of the billing rate for that particular copy.

While it should be obvious from the above discussion, the overall operation of the billing system of the invention will now be briefly reviewed with reference to the drawing and to Table I appearing below, which is illustrative of a portion of a possible billing rate schedule, each billing unit charge being assigned a charge value of C cents.

Table I

| Copy Count | Binary Counter | Table Y ROM(Charge OUTPUT Units) | Table Z ROM(Charge OUTPUT Units) |
|---|---|---|---|
| 1 | 0001 | 1010(10) | 0101(5) |
| 2 | 0010 | 1000(8) | 0100(4) |
| 3 | 0011 | 0110(6) | 0011(3) |
| 4 | 0100 | 0011(3) | 0010(2) |
| 5 | 0101 | 0001(1) | 0001(1) |

For each copy made in a single run a copy pulse is generated on lines 12 and 38. The copy pulses set flip-flop 72 which enables AND gate 66 to apply pulses from the clock generator 64 to the down counter 61 and to meter 71.

The copy count pulses on line 12 are simultaneously fed into the binary copy counter 11 which, in conventional fashion, generates a different binary code for each successive copy from the same copy run, as represented in the illustrative table. The output codes from the binary counter 11 are fed to the ROM 17 which, as discussed, is programmed to generate a plurality of sets of billing rate codes 5 and 6 in response to successive copy count inputs, again as illustrated in the table, each set (table Y or table Z) being associated with a particular machine mode of operation.

Depending on the mode of operation of the copy machines, one of the sets of binary codes 5 or 6 is gated by means of the appropriate table select signal on lines 36 or 46 through AND gates 32–35 or 42–45. The output code associated with each copy from the selected AND gates is OR gated via circuits 50 into the down counter 61 to preset the counter 61 to the value thereof.

Thus, referring to the table, and assuming operation of the copy machine in mode Y, the first copy of a run would generate a binary 10 from the ROM which would be set into the down counter 61. The down counter would be stepped 10 times, the 10 pulses being counted by meter 71, at which time a zero-reached signal would reset flip-flop 72 to disable AND gate 66 and the application of clock pulses to the meter 71. This cycle would be repeated for copy 2 with 8 billing units being recorded and so on for each successive copy from the same run. At the end of the run a reset pulse is generated as discussed previously to clear the counters 11 and 61 to insure proper starting points for the next copy run.

At the end of a preselected period the total count appearing on the meter 71 is simply multiplied by a unit billing charge to arrive at the total bill for the lease of the machine for the selected period.

Changes in the rate structure can be accommodated by simply changing the ROM 17 to provide different sets of billing rate codes for the various copy code inputs from counter 11.

As should be understood, the binary counter 11 may be increased in capacity as desired to count up to any selected value. In addition, ROM units are available which accept more than the four input digits illustrated in the drawing. By varying these parameters, the capacity of the system may be easily varied.

What is claimed is:
1. A billing system for use in a copy machine comprising,
   a binary copy counter for generating different binary codes in response to a series of input pulses, each pulse representing a single copy made from the same copy run,
   an addressable memory programmed to generate a unique binary billing signal for each different code or group of codes from said copy counter, said billing signals operating as weighting factors representative of the relative cost of each of said copies,
   means for translating said billing signals into output pulse trains, the number of output pulses in said trains being proportional to the value of said billing signals, and
   counting means for counting the total number of said output pulses generated whereby said total number may be multiplied by a unit billing factor to arrive at a billing charge for the copies made.

2. The combination recited in claim 1 wherein said memory comprises a semiconductor read-only memory.

3. The combination recited in claim 2 wherein said memory provides a plurality of sets of billing codes.

4. The combination recited in claim 3 further including means for selectively gating one of said sets to said counting means depending on the mode of operation of said copy machine.

5. The combination recited in claim 1 wherein said counting means comprises
   a clock pulse generator, an output counter responsive to pulses from said generator for counting from a first preset value to a second value at a rate determined by the frequency of pulses from said generator, and means for periodically presetting said output counter to values represented by said billing codes and stepping said output counter by applying clock pulses thereto until said output counter reaches said second value.

6. The combination recited in claim 5 further including means for counting the total number of pulses required to step said output counter.

7. The combination recited in claim 5 wherein said output counter is a down counter preset by said binary codes and counted down to zero, and further including means for disconnecting said generator from said counter upon reaching zero.

8. A billing arrangement for a copy machine comprising, means for generating a first train of pulses, each pulse representing a copy made from a single copy run, a first binary counter for generating a different binary output code for each pulse in said first train, a programmable memory, said memory addressable by said binary counter for generating a plurality of binary output billing codes for each output code from said first counter, each binary output code being representative of the billing rate for the copy corresponding thereto, and output means for generating output pulses for each billing code, the number of said output pulses being proportional to the value of said binary billing codes.

9. The combination recited in claim 8 wherein said memory comprises a semiconductor read-only memory.

10. The combination recited in claim 8 wherein said memory generates a plurality of sets of billing rate codes, each set being associated with a different mode of operation of the machine, and gating means for selecting one of said sets for application to said output means.

11. A system for generating a weighted total by assigning weighting factors to different events in a series of recurring events comprising, means for generating a first train of pulses, each pulse representing the occurrence of an event, a binary counter for generating a different binary output code in response to each pulse in said first train, a programmable memory, said memory addressable by said binary counter for generating a binary weighting code in response to each output code from said first counter, and output means coupled to said memory for generating second trains of output pulses, each of said second trains associated with a particular event, the number of pulses in each of said second trains being proportional to the value of said weighting factor corresponding to said event.

12. The combination recited in claim 11 wherein said memory comprises a semiconductor read-only memory.

13. The combination recited in claim 11 wherein said memory generates a plurality of sets of weighting codes, and means for selecting one of said sets for application to said output means depending upon the manner of origination of said events.

14. In a machine having a plurality of modes of operation, each mode operable to effect recurring events, apparatus for generating a weighted total of said events by assigning weighting factors to each event in a series of recurring events comprising, counting means for generating an output uniquely identifying each event in said series, weighting means for generating a plurality of sets of weighting factors in response to the output from said counting means, means for selecting one of said sets for application to a totalling means in response to the mode of operation of said machine, and totalling means for generating a total representative of the sum of said weighting factors.

15. The combination recited in claim 14 wherein, said counting means is a binary counter responsive to said recurring events to generate a different binary code for each event, and said weighting means comprises an electronic memory addressable by said counter for generating binary codes representative of said weighting factors.

16. The combination noted in claim 15 wherein said memory comprises a semiconductor read-only memory.

* * * * *